United States Patent
Naumann (10) Patent No.: US 7,042,845 B1
(45) Date of Patent: May 9, 2006

(54) SYSTEM AND METHOD FOR TIME DIVISION MULTIPLEXED SWITCHING OF DATA USING A HIGH-SPEED PACKET SWITCH

(75) Inventor: Joel Naumann, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 09/877,686

(22) Filed: Jun. 8, 2001

(51) Int. Cl.
*H04L 12/56* (2006.01)

(52) U.S. Cl. .................................... 370/235; 370/389
(58) Field of Classification Search ............... 370/235, 370/352, 389, 392, 395.4, 395.42, 465, 468, 370/493, 535
See application file for complete search history.

(56) References Cited

U.S. PATENT DOCUMENTS

| | | | |
|---|---|---|---|
| 6,091,709 A * | 7/2000 | Harrison et al. ............ 370/235 |
| 6,151,336 A | 11/2000 | Cheng et al. | |
| 6,172,973 B1 | 1/2001 | Akhtar et al. | |
| 6,584,122 B1 * | 6/2003 | Matthews et al. .......... 370/493 |
| 6,678,280 B1 * | 1/2004 | Kim et al. .................. 370/429 |
| 6,728,238 B1 * | 4/2004 | Long et al. ................. 370/352 |

OTHER PUBLICATIONS

Press release entitled "Mitel Introduces Industry's Largest Capacity WAN Switching Chip", Ottawa, Canada, Oct. 10, 2000, 4 pages.

* cited by examiner

*Primary Examiner*—Chi Pham
*Assistant Examiner*—Anh-Vu Ly
(74) *Attorney, Agent, or Firm*—Blakely, Sokoloff, Taylor & Zafman LLP (57) ABSTRACT

A system and method for switching data using a high-speed packet switch are described. Multiple communications are received along at least one input communication line. Each communication is framed into one or more packets, each packet containing destination information related to a destination module for a predetermined amount of data contained within each packet. Each packet is then transmitted to the destination module based on the destination information. Each packet is further retrieved from one storage module of multiple storage modules contained within the destination module at a rate dictated by a destination address field contained within the destination information and multiplexed to obtain a communication to be transmitted along an output communication line.

112 Claims, 6 Drawing Sheets

SYSTEM AND METHOD FOR TIME DIVISION MULTIPLEXED SWITCHING OF DATA USING A HIGH-SPEED PACKET SWITCH

FIELD OF THE INVENTION

The present invention relates generally to data communications and, more particularly, to a system and method for time division multiplexed switching of data using a high-speed packet switch.

BACKGROUND

The substantial growth of the communications industry has highlighted the limited capacity of existent data communication systems to handle rapidly expanding applications. In order to increase the capacity of the systems, various methods have been considered, for example frequency division multiplexing (FDM) or time division multiplexing (TDM).

Communication networks, such as telephone networks, often multiplex numerous data channels onto a given data transmission medium. In one embodiment, a data channel is a voice channel associated with a given communication. Alternatively, data channels may include a dedicated computer modem channel, or a telephone network maintenance channel. In one embodiment, a data transmission medium is a wire transmission line. Alternatively, the data transmission medium may be a radio frequency bandwidth, a fiber optic line, or any other type of communication link.

TDM combines the data channels by assigning each channel a different time slot in a set of sequential time slots and by repeatedly transmitting a fixed sequence of time slots over the single data transmission medium. In one embodiment, each data transport unit or time slot includes 8 bits of data and the fixed sequence of time slots is 125 microseconds. As a result, each 8-bit data transport unit or time slot is transmitted every 125 microseconds.

TDM switches are a growing part of the existing voice networks and are increasingly found in voice-enabled networking equipment. The use of TDM switches in packet-based networking equipment requires flexibility in size and assignment of ports, and requires support for multiple switching domains, each switching domain having independent timing.

SUMMARY

A system and method for switching data using a high-speed packet switch are described. Multiple communications are received along at least one input communication line. Each communication is framed into one or more packets, each packet containing destination information related to a destination module for a predetermined amount of data contained within each packet. Each packet is then transmitted to the destination module based on the destination information. Each packet is further retrieved from one storage module of multiple storage modules contained within the destination module at a rate dictated by a destination address field contained within the destination information and multiplexed to obtain a communication to be transmitted along an output communication line.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for time division multiplexed switching of data using a high-speed packet switch are described.

In the following detailed description of embodiments of the invention, reference is made to the accompanying drawings in which like references indicate similar elements, and in which are shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
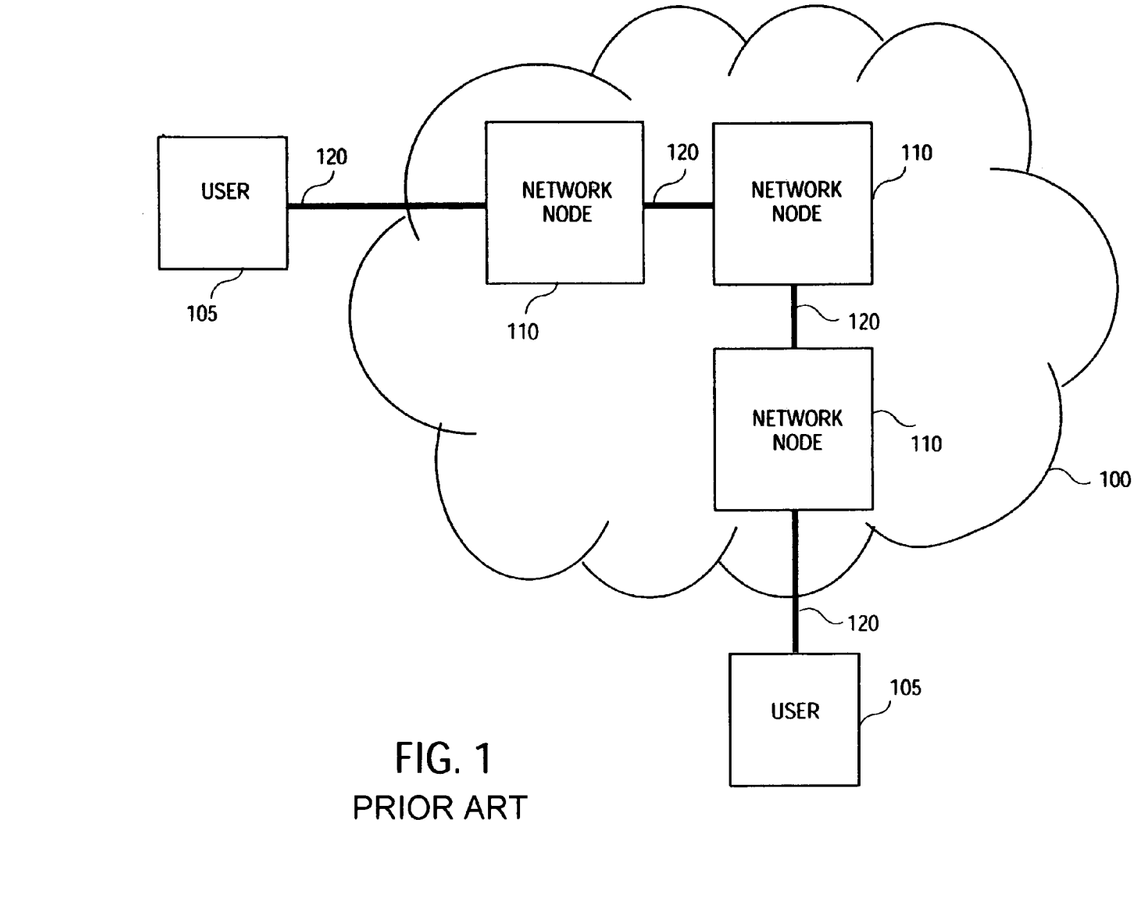
FIG. 1 is a block diagram of a conventional network.

FIG. 1 is a block diagram of a conventional network. As illustrated in FIG. 1, network 100 includes multiple network nodes 110, for example multiple network routers connected through communication links 120. Alternatively, network nodes 110 may be network switches connected through communication links 120. Users 105 communicate with network 100 via similar communication links 120. Data is transmitted from a user 105 through routers 110 within network 100 to another user 105. In one embodiment, each router 110 receives voice and data communications along a communication link 120, for example a T1/E1 transmission line, and routes the communications to the destination along another communication link 120.

Figure 2:
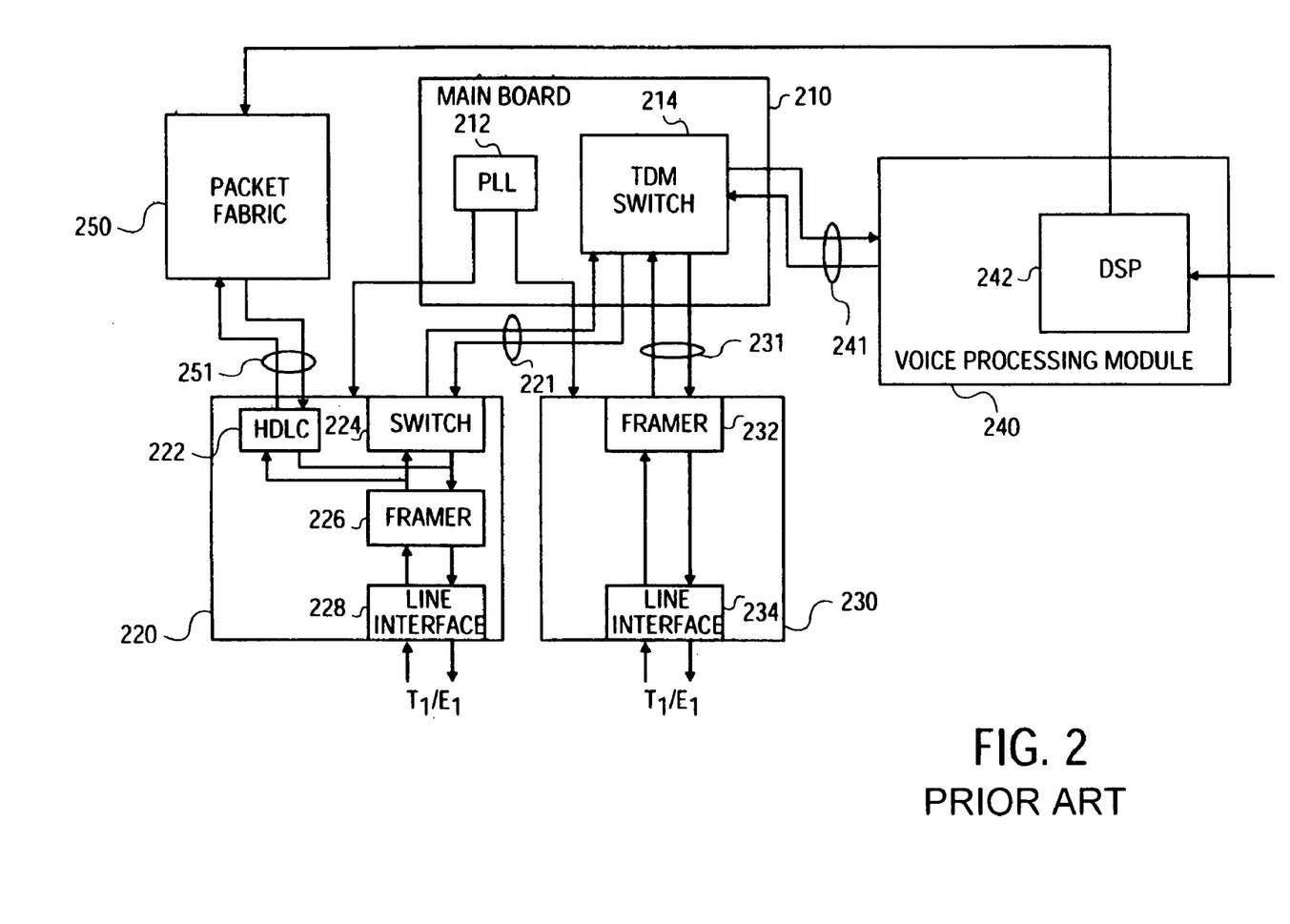
FIG. 2 is a block diagram of a network node within the network.

FIG. 2 is a block diagram of a network node 110, for example a router, within the network 100. As illustrated in FIG. 2, router 110 includes a main board 210 and multiple plug-in modules 220, 230, 240 connected to the main board 210.

Main board 210 further includes a timing device 212, for example a Phase-Lock-Loop (PLL) device, and a TDM switch 214. The PLL device 212 provides a timing reference to the TDM switch 214. In addition, PLL device 212 provides the same timing reference to the plug-in modules 220 and 230. Plug-in module 220 exchanges time sensitive data, for example voice data, with the TDM switch 214 over multiple lines 221 forming a TDM bus. Similarly, module 230 exchanges time sensitive data with the TDM switch 214 over multiple lines 231 forming a second TDM bus.

Plug-in modules 220 and 230 share common features. Plug-in module 220 includes a line interface 228 for receiving data along multiple transmission lines, for example T1/E1 lines, and a framer 226, connected to the line interface 228, for framing the data to be transmitted along lines 221. Similarly, plug-in module 230 includes line interface 234 and framer 232. In one embodiment, plug-in module 220 further includes a switch module 224 that connects to the TDM switch 214. Alternatively, as shown in plug-in module 230, framer 232 may be connected directly to the TDM switch 214.

Traffic of data along any given transmission line, for example any T1/E1 line, contains a mix of TDM traffic, for example time sensitive voice data, and data traffic, for example low priority packet data. The amount of TDM traffic versus data traffic is variable. Computing efforts for processing the time sensitive voice data, for example compression and/or echo cancellation, are significant and also variable as a function of the compression algorithms used.

As illustrated in FIG. 2, TDM traffic transmitted through plug-in module 220 is forwarded to the TDM switch 214 through the switch 224. At the same time, packets of data traffic transmitted through plug-in module 220 are routed to a High-Level Data Link Control (HDLC) device 222, which permits synchronous, code-transparent packet transmission to a packet fabric 250 via transmission lines 251. In FIG. 2, packet fabric 250 is located separately from the TDM switch 214.

Plug-in module 240 is a voice processing module, which receives time sensitive data, for example voice data, from a user. In one embodiment, voice processing module 240 converts the voice data received from module 220 via TDM bus 221 into packets and transmits the packets to the packet fabric 250.

As shown in FIG. 2, in general, TDM switch 214 operates on a single timing reference, for example a timing reference provided by PLL device 212. A replication of PLL device 212, in order to create multiple timing references, necessarily brings about a replication of the TDM switch 214, which could increase the cost of the router 110.

Also, router 110 includes both the packet fabric 250 to handle packets of data and the TDM switch 214 to handle the TDM traffic, which complicates the structure of router 110. In addition, TDM switch 214 is fixed in size and the assignment of ports to modules 220 and 230 is not flexible.

Figure 3:
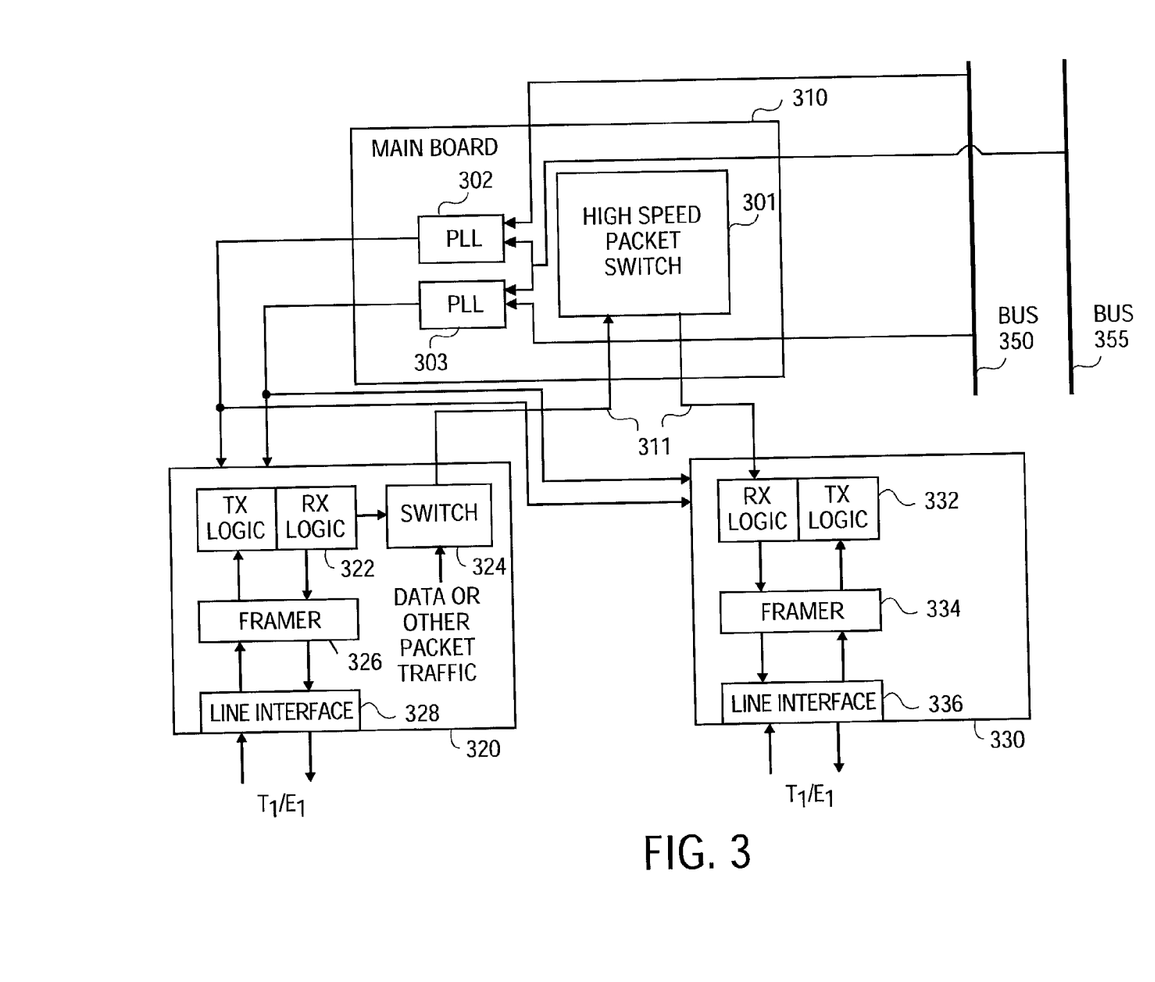
FIG. 3 is a block diagram of one embodiment for a system for time division multiplexed switching of data using a high-speed packet switch within the network.

FIG. 3 is a block diagram of one embodiment for a system for time division multiplexed switching of data using a high-speed packet switch within the network. As illustrated in FIG. 3, in one embodiment, the system includes a main board 310 and plug-in modules 320 and 330, for example line cards, connected to the main board 310.

In one embodiment, the main board 310 further includes a packet switch 301, for example a high-speed packet switch, and one or more timing devices, for example PLL devices, of which PLL devices 302 and 303 are shown. In one embodiment, the high-speed packet switch 301 operates at a predetermined speed, for example a speed of 20 Gb per second. Over a single transmission line, the high-speed packet switch 301 classifies the incoming traffic and allows high priority TDM traffic to be transmitted before low priority data traffic.

In one embodiment, the high-speed packet switch 301 is connected to the plug-in modules 320, 330 and exchanges data with each plug-in module 320 or 330 via high-speed serial transmission lines 311. In one embodiment, the high-speed packet switch 301 receives data from plug-in module 320 at a predetermined rate, for example a rate of approximately 2.0 gigabit per second, and transmits data along high-speed lines 311 to plug-in module 330, at a similar predetermined rate, for example 2.0 gigabit per second.

In one embodiment, each PLL device 302, 303 recovers a first timing reference from a primary bus 350 and a second timing reference from a secondary bus 355. In one embodiment, primary bus 350 and secondary bus 355 are connected to each plug-in module 320, 330. An output of each PLL device 302, 303 is distributed to each plug-in module 320, 330. The distribution of the outputs allows plug-in modules 320 and 330 to perform actions at the same rate.

In one embodiment, plug-in modules 320 and 330 are line cards, which share certain common features. Line card 320 includes a line interface 328 for receiving data along multiple transmission lines, for example T1/E1 lines, and a framer 326, connected to the line interface 328, for framing the data to be transmitted along lines 311. Similarly, line card 330 includes line interface 336 and framer 334. In one embodiment, line card 320 further includes transmitting (Tx) and receiving (Rx) logic module 322 connected to the framer 326 and a switch 324 that connects to the high-speed packet switch 301 via transmission lines 311. Alternatively, as shown in line card 330, transmitting (Tx) and receiving (Rx) logic module 332 may be connected directly to the framer 334 and the high-speed packet switch 301.

In one embodiment described in further detail below, TDM traffic and data traffic received along the T1/E1 lines within line card 320 is packetized or framed into multiple packets containing a predetermined amount of data, for example one byte of high priority data per packet for the TDM traffic.

Figure 4A:
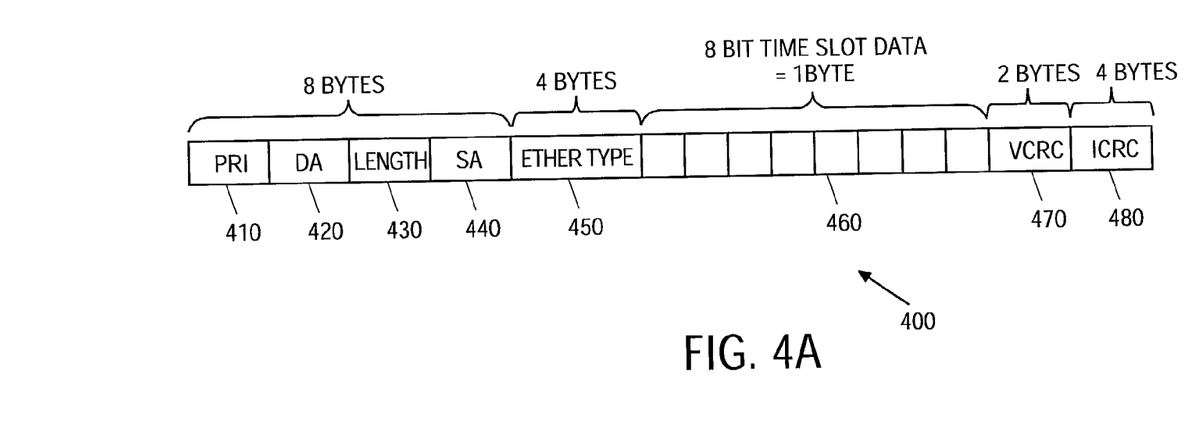
FIG. 4A is a block diagram of one embodiment for a packet.

FIG. 4A is a block diagram of one embodiment for a packet. As illustrated in FIG. 4A, packet 400 includes a priority (PRI) field 410, which specifies the priority of the packet. In one embodiment, for a high priority data packet 400, the priority field 410 has a zero value indicating that the packet 400 contains high priority TDM traffic. Alternatively, for a low priority data packet, the priority field 410 may have a one value indicating that the packet 400 contains low priority data traffic. It is to be understood that other values may be assigned to priority field 410 to indicate the priority of each packet 400.

In one embodiment, packet 400 further includes a destination address field 420. In one embodiment, destination address field 420 includes an address scheme identifying a destination for the packet 400. The address scheme will be described in further detail below in connection with FIG. 4B.

In one embodiment, packet 400 further includes a length field 430, which indicates the length of the information transmitted. In one embodiment, for a packet containing high priority TDM traffic, the length field 430 is fixed and has a one value. Alternatively, for a packet containing low priority data traffic, the length field 430 is variable and may have any value from 1 to 512.

In one embodiment, packet 400 further includes a source address field 440, which indicates the source of data and which is identical in format to the destination address field 420, and an ether type field 450 with a length of 4 bytes, which is inactive. In one embodiment, the priority field 410, destination address 420, length field 430, and source address field 440 total 8 bytes of information.

In one embodiment, packet 400 further includes a payload 460, which contains a predetermined amount of data, for example TDM traffic or data traffic to be transmitted along the transmission lines. In one embodiment, payload 460 contains the equivalent of 8 bits or 1 byte of data. Alternatively, payload 460 may contain another predetermined number of bytes of data.

In one embodiment, packet 400 further includes a variant cyclic redundancy check (VCRC) field 470 for detecting errors in the packet as it travels from hop to hop through the transmission lines 311, and an invariant cyclic redundancy check (ICRC) field 480 for detecting errors in data contained within the payload 460 of the data packet 400. In one embodiment, the length of the VCRC field 470 is 2 bytes and the length of the ICRC field 480 is 4 bytes.

As a result, in one embodiment, for 1 byte of data within payload 460, each packet 400 contains 19 bytes of information, specifically 12 bytes for the priority field 410, destination address 420, length field 430, source address field 440, and ether type field 450, 1 byte of data, 2 bytes of VCRC, and 4 bytes of ICRC.

Figure 4B:
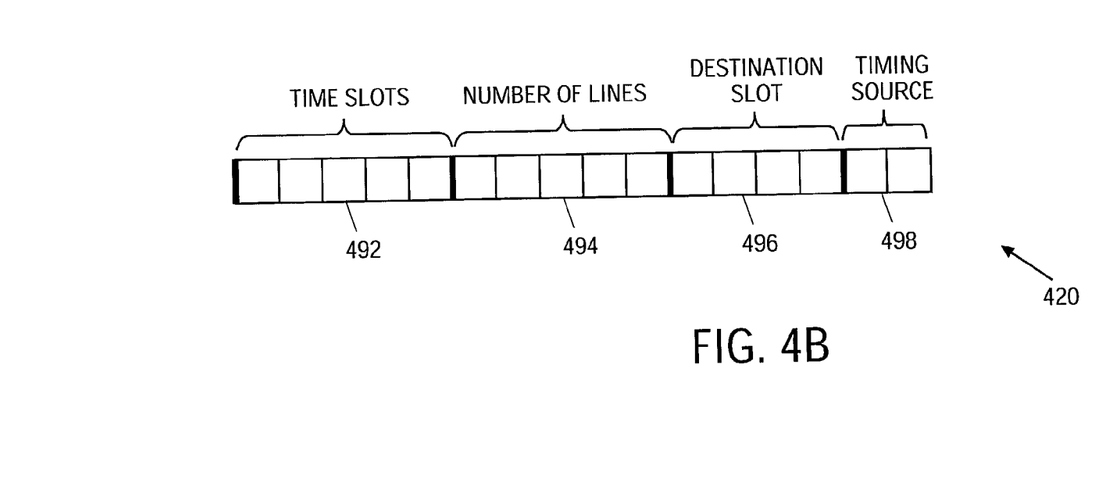
FIG. 4B is a block diagram of one embodiment for a destination address field within the packet.

FIG. 4B is a block diagram of one embodiment for a destination address field within the packet. As illustrated in FIG. 4B, destination address field 420 includes a time slot field 492, which indicates a destination time slot within a given transmission line, for example one of 32 time slots per each T1/E1 line, a line field 494, which indicates the transmission line or output port, for example 28 T1/E1 lines for a DS3 connection, a destination slot field 496, which identifies one of up to 16 destination slots, and a timing source field 498. In one embodiment, the length of the destination address field 420 is 16 bits. Out of the available 16 bits, using binary representation, the destination address field 420 includes 5 bits assigned for the time slot field 492, 5 bits assigned for the line field 494, 4 bits assigned for the destination slot field 496, and 2 bits assigned for the timing source field 498. In one embodiment, each of the 2 bits assigned to the timing source field 498 can have a one or a zero value, which results in four combinations allowing up to four TDM switch timing domains to be connected to the high-speed packet switch 301.

Figure 5:
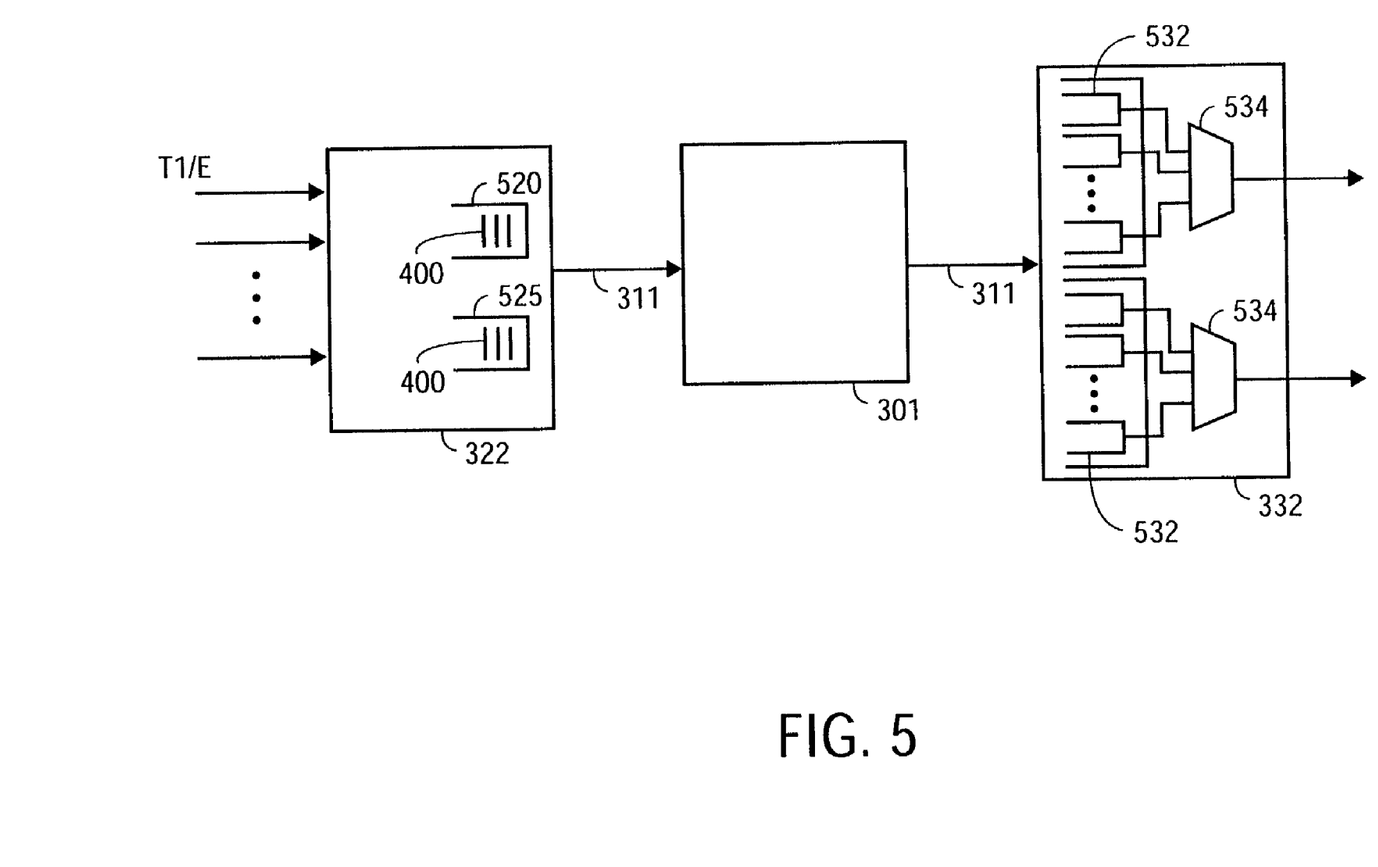
FIG. 5 is a block diagram of a detailed embodiment for the system for time division multiplexed switching of data.

FIG. 5 is a block diagram of a detailed embodiment for the system for time division multiplexed switching of data. As illustrated in FIG. 5, in one embodiment, a transmission module, for example Tx/Rx logic module 322 within line card 320, stores packets 400 containing TDM traffic and data traffic transmitted along one or more T1/E1 lines into buffers 520, 525. In one embodiment, packets 400 containing TDM traffic are stored in high priority buffer 520, while packets containing data traffic are stored in low priority buffer 525.

In one embodiment, packets 400 stored in buffers 520, 525 are transmitted along multiple virtual paths over a single transmission line 311 to the high-speed packet switch 301. In one embodiment, subsequent to the receipt of the packets 400 by the high-speed packet switch 301, each packet 400 is stored in a switch buffer (not shown) based on its assigned priority. In one embodiment, the high-speed packet switch 301 prioritizes the transmission of packets along transmission line 311 to a destination module, for example Tx/Rx logic module 332 within line card 330, transmitting the packets containing high priority TDM traffic before packets containing low priority data traffic.

In one embodiment, each packet 400 has a different destination and corresponds to one time slot in a set of sequential time slots. In one embodiment, the sequence of time slots between transmission module 322 and destination module 332 within the respective line cards 320 and 330 is 125 microseconds. For example, for a T3 high-speed line 311 carrying data to the high-speed packet switch 301, the T3 line having 28 T1 lines, each T1 line having 24 channels, there are 28×24=672 packets 400 or time slots to be switched.

In one embodiment, packet switch 301 uses a destination slot field 496 within the destination address field 420 of each packet 400 to route the packet 400 to the destination Tx/Rx logic module 332. Subsequent to the determination of the destination Tx/Rx logic module 332, packet switch 301 analyzes the line field 494 and time slot field 492 of the destination address field 420 of each packet 400 to store the packet 400 within a storage module 532, for example a First-In-First-Out (FIFO) storage module, located within the Tx/Rx logic module 332. In one embodiment, each FIFO storage module 532 has a capacity of four bytes and corresponds to one channel of a transmission line.

In one embodiment, destination Tx/Rx logic module 332 further includes one multiplexer 534 for a predetermined number of FIFO storage modules 532, for example one multiplexer 534 for each group of 24 FIFO storage modules 532 corresponding to one T1 transmission line. In one embodiment, each multiplexer 534 reads packets 400 out of the FIFO storage modules 532 at a rate dictated by the timing source field 498, and in a sequence dictated by the destination time slot field 492 within the destination address field 420 of each packet 400. Each multiplexer 534 then forwards the multiplexed TDM and data traffic to an output port.

In one embodiment, considering a high-speed serial line 311 with a capacity of 2.0 gigabit per second, and considering that each packet 400 includes 19 bytes of information, or 152 bits, the time to transmit each packet 400 along transmission line 311 is 152 bits times the bit period of $0.5 \times 10^{-9}$ seconds, which equals 76 nanoseconds. Considering a TDM frame time period of 125 microseconds for the sequence of time slots, the number of packets that may be transmitted along high-speed line 311 within the 125•s traffic period equals 1644 time slots, a greater number than the capacity of a T3 line, calculated above at 672 time slots per line. Therefore, the high-speed packet switch 301 will support multiple connections without service slowdown or interruption.

In one embodiment, considering the high-speed transmission line 311 with a capacity of 2.0 gigabit per second, if a low priority data packet 400 of a predetermined length, for example 512 bytes, is in the process of being transmitted along line 311, and a high priority data packet 400 is received and must wait in the queue to be transmitted after the transmission of the low priority data packet is concluded, the time necessary to transmit both low priority and high priority data packets is calculated by adding the 512 bytes for the low priority packet to the 19 bytes for the high priority packet, multiplying the result by 8 bits, and multiplying the subsequent result by the bit period of $0.5 \times 10^{-9}$ seconds, which equals to 2.1 microseconds. The 2.1 microseconds time to transmit both the low priority data packet and the high priority data packet is lower than the 125•s traffic period and allows transmission of data to destination without any delay.

Figure 6:
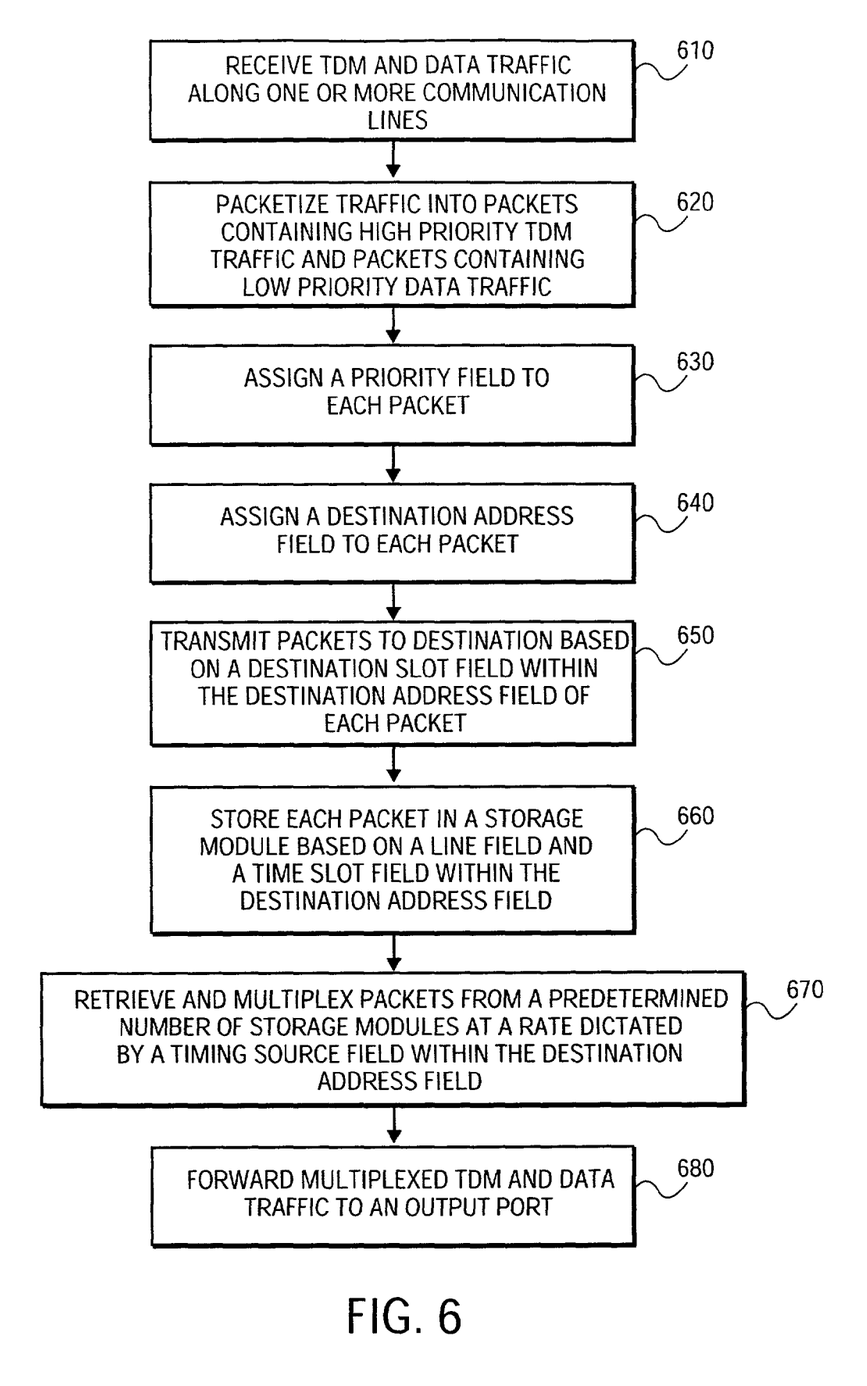
FIG. 6 is a flow diagram of one embodiment for a method for time division multiplexed switching of data using a high-speed packet switch.

FIG. 6 is a flow diagram of one embodiment for a method for time division multiplexed switching of data using a high-speed packet switch. As illustrated in FIG. 6, at processing block 610, TDM and data traffic is received along one or more communication lines. In one embodiment, line card 320 receives TDM and data traffic along one or more T1/E1 lines.

At processing block 620, TDM and data traffic is packetized into multiple packets 400 containing a predetermined amount of data. In one embodiment, line card 320 transforms the TDM and data traffic into multiple packets 400. Packets 400 include packets containing high priority TDM traffic and packets containing low priority data traffic.

At processing block 630, a priority field 410 is assigned to each packet 400. In one embodiment, line card 320 assigns the priority field 410 to each packet 400. The priority field 410 of a packet containing high priority DM traffic has a zero value, while the priority field 410 of a packet containing low priority data traffic has a one value.

At processing block 640, a destination address field 420 is assigned to each packet 400. In one embodiment, line card 320 assigns the destination address field 420 to each packet 400. The destination address field 420 contains information regarding the path of the corresponding packet 400 from an input port to an output port.

At processing block 650, packets 400 are transmitted to destination based on a destination slot field 496 within the destination address field 420 of each packet 400. In one embodiment, a high-speed packet switch 301 transmits packets 400 to a destination line card 330 based on the destination slot field 496.

At processing block 660, each packet 400 is stored in a storage module 532 based on a line field 494 and a time slot field 492 within the destination address field 420 of each packet 400. In one embodiment, packet switch 301 stores each packet 400 in a storage module 532 within line card 330 based on the line field 494 and the time slot field 492.

At processing block 670, packets 400 are retrieved and time multiplexed from a predetermined number of storage modules 532 at a rate dictated by a timing source field 498, and in an order dictated by the destination time slot field 492, both within the destination address field 420 of each packet 400. In one embodiment, a multiplexer 534 within line card 330 retrieves and multiplexes the packets 400 at the rate dictated by the timing source field 498.

Finally, at processing block 680, the multiplexed TDM and data traffic is forwarded to an output port. In one embodiment, multiplexer 534 transmits the multiplexed traffic to the output port.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
    receiving a plurality of communications along at least one input communication line;
    framing each communication into a plurality of packets, each packet of said plurality of packets containing destination information related to a destination module for a predetermined amount of data contained within said each packet;
    encoding a destination address field into said destination information of said each packet, said destination address field identifying said destination module for said each packet; and
    encoding a destination slot field into said destination address field, said destination slot field identifying said destination module for said each packet.

2. The method according to claim 1, wherein each communication of said plurality of communications comprises time division multiplexed (TDM) traffic and data traffic.

3. The method according to claim 2, wherein said framing further comprises:
    framing said TDM traffic into at least one packet containing high priority data transmitted during said each communication; and
    framing said data traffic into at least one packet containing low priority data transmitted during said each communication.

4. The method according to claim 3, wherein said framing further comprises:
    encoding a predetermined value into a priority field within said each packet, said predetermined value indicating a priority of transmission for said predetermined amount of data within said each packet.

5. The method according to claim 4, wherein said priority field within said at least one packet containing high priority data has a zero value.

6. The method according to claim 4, wherein said priority field within said at least one packet containing low priority data has a one value.

7. The method according to claim 1, wherein said method further comprises:
    encoding a time slot field into said destination address field, said time slot field indicating one destination time slot of a plurality of destination time slots assigned to an output communication line coupled to said destination module; and
    encoding a line field into said destination address field, said line field indicating said output communication line.

8. The method according to claim 7, wherein said time slot field comprises five bits to indicate said one destination time slot.

9. The method according to claim 7, wherein said line field comprises five bits to indicate said output communication line.

10. The method according to claim 1, wherein said method further comprises:
    encoding a timing source field into said destination address field, said timing source field indicating a predetermined number of timing domains for transmitting said each packet to said destination module.

11. The method according to claim 10, wherein said timing source field comprises two bits to indicate said predetermined number of timing domains.

12. The method according to claim 1, wherein said destination slot field comprises four bits to identify said destination module.

13. A method comprising:
    receiving a plurality of packets, each packet of said plurality of packets containing destination information related to a destination module for a predetermined amount of data contained within said each packet;

transmitting said each packet to said destination module based on said destination information, wherein said destination information comprises a destination address field identifying said destination module for said each packet wherein said destination address field comprises a time slot field, indicating one destination time slot of a plurality of destination time slots assigned to an output communication line coupled to said destination module and a line field indicating said output communication line.

14. The method according to claim 13, wherein said destination address field comprises a destination slot field identifying said destination module for said each packet.

15. The method according to claim 14, wherein said transmitting further comprises transmitting said each packet to said destination module based on said destination slot field of said destination address field.

16. The method according to claim 13, wherein said destination address field comprises a timing source field indicating a predetermined number of timing domains for transmitting said each packet to said destination module.

17. The method according to claim 13, wherein said transmitting further comprises storing said each packet into one storage module of a plurality of storage modules contained within said destination module based on said time slot field and said line field of said destination address field.

18. The method according to claim 17, wherein each storage module of said plurality of storage modules is a first-in-first-out (FIFO) storage module.

19. The method according to claim 17, wherein each storage module of said plurality of storage modules has a capacity of four bytes and corresponds to one channel of said output communication line.

20. A method comprising:
retrieving a plurality of packets stored into a plurality of storage modules, each packet of said plurality of packets being retrieved from one storage module of said plurality of storage modules at a rate dictated by a destination address field contained within said each packet, wherein said destination address field comprises a timing source field indicating a predetermined number of timing domains available to transmit said each packet; and
multiplexing said each packet to obtain a communication to be transmitted along an output communication line.

21. The method according to claim 20, wherein each storage module of said plurality of storage modules is a first-in-first-out (FIFO) storage module.

22. The method according to claim 20, wherein each storage module of said plurality of storage modules has a capacity of four bytes and corresponds to one channel of said output communication line.

23. The method according to claim 20, wherein said timing source field comprises two bits to indicate said predetermined number of timing domains.

24. The method according to claim 23, wherein said timing source field indicates up to four timing domains to transmit said each packet.

25. A system comprising:
means for receiving a plurality of communications along at least one input communication line;
means for framing each communication into a plurality of packets, each packet of said plurality of packets containing destination information related to a destination module for a predetermined amount of data contained within said each packet;
means for encoding a destination address field into said destination information of said each packet, said destination address field identifying said destination module for said each packet; and
means for encoding a destination slot field into said destination address field, said destination slot field identifying said destination module for said each packet.

26. The system according to claim 25, wherein each communication of said plurality of communications comprises time division multiplexed (TDM) traffic and data traffic.

27. The system according to claim 25, further comprising:
means for framing said TDM traffic into at least one packet containing high priority data transmitted during said each communication; and
means for framing said data traffic into at least one packet containing low priority data transmitted during said each communication.

28. The system according to claim 27, further comprising:
means for encoding a predetermined value into a priority field within said each packet, said predetermined value indicating a priority of transmission for said predetermined amount of data within said each packet.

29. The system according to claim 28, wherein said priority field within said at least one packet containing high priority data has a zero value.

30. The system according to claim 28, wherein said priority field within said at least one packet containing low priority data has a one value.

31. The system according to claim 25, further comprising:
means for encoding a time slot field into said destination address field, said time slot field indicating one destination time slot of a plurality of destination time slots assigned to an output communication line coupled to said destination module; and
means for encoding a line field into said destination address field, said line field indicating said output communication line.

32. The system according to claim 31, wherein said time slot field comprises five bits to indicate said one destination time slot.

33. The system according to claim 31, wherein said line field comprises five bits to indicate said output communication line.

34. The system according to claim 25 further comprising:
means for encoding a timing source field into said destination address field, said timing source field indicating a predetermined number of timing domains for transmitting said each packet to said destination module.

35. The system according to claim 34, wherein said timing source field comprises two bits to indicate said predetermined number of timing domains.

36. The system according to claim 25, wherein said destination slot field comprises four bits to identify said destination module.

37. A system comprising:
means for receiving a plurality of packets, each packet of said plurality of packets containing destination information related to a destination module for a predetermined amount of data contained within said each packet;
means for transmitting said each packet to said destination module based on said destination information, wherein said destination information comprises a destination address field identifying said destination module for said each packet, wherein said destination address field comprises a time slot field, indicating one destination time slot of a plurality of destination time slots assigned to an output communication line coupled to said destination module, and a line field indicating said output communication line.

38. The system according to claim 37, wherein said destination address field comprises a destination slot field identifying said destination module for said each packet.

39. The system according to claim 38, further comprising means for transmitting said each packet to said destination module based on said destination slot field of said destination address field.

40. The system according to claim 37, wherein said destination address field comprises a timing source field indicating a predetermined number of timing domains for transmitting said each packet to said destination module.

41. The system according to claim 37, further comprising means for storing said each packet into one storage module of a plurality of storage modules contained within said destination module based on said time slot field and said line field of said destination address field.

42. The system according to claim 41, wherein each storage module of said plurality of storage modules is a first-in-first-out (FIFO) storage module.

43. The system according to claim 41, wherein each storage module of said plurality of storage modules has a capacity of four bytes and corresponds to one channel of said output communication line.

44. A system comprising:
means for retrieving a plurality of packets stored into a plurality of storage modules, each packet of said plurality of packets being retrieved from one storage module of said plurality of storage modules at a rate dictated by a destination address field contained within said each packet, wherein said destination address field comprises a timing source field indicating a predetermined number of timing domains available to transmit said each packet; and
means for multiplexing said each packet to obtain a communication to be transmitted along an output communication line.

45. The system according to claim 44, wherein each storage module of said plurality of storage modules is a first-in-first-out (FIFO) storage module.

46. The system according to claim 44, wherein each storage module of said plurality of storage modules has a capacity of four bytes and corresponds to one channel of said output communication line.

47. The system according to claim 44, wherein said timing source field comprises two bits to indicate said predetermined number of timing domains.

48. The system according to claim 47,
wherein said timing source field indicates up to four timing domains to transmit said each packet.

49. A computer readable medium containing executable instructions, which, when executed in a processing system, cause said processing system to perform a method comprising:
receiving a plurality of communications along at least one input communication line; a framing each communication into a plurality of packets, each packet of said plurality of packets containing destination information related to a destination module for a predetermined amount of data contained within said each packet;
encoding a destination address field into said destination information of said each packet, said destination address field identifying said destination module for said each packet; and
encoding a destination slot field into said destination address field, said destination slot field identifying said destination module for said each packet.

50. The computer readable medium according to claim 49, wherein each communication of said plurality of communications comprises time division multiplexed (TDM) traffic and data traffic.

51. The computer readable medium according to claim 50, wherein said framing further comprises:
framing said TDM traffic into at least one packet containing high priority data transmitted during said each communication; and
framing said data traffic into at least one packet containing low priority data transmitted during said each communication.

52. The computer readable medium according to claim 51, wherein said framing further comprises:
encoding a predetermined value into a priority field within said each packet, said predetermined value indicating a priority of transmission for said predetermined amount of data within said each packet.

53. The computer readable medium according to claim 49, wherein said method further comprises:
encoding a time slot field into said destination address field, said time slot field indicating one destination time slot of a plurality of destination time slots assigned to an output communication line coupled to said destination module; and
encoding a line field into said destination address field, said line field indicating said output communication line.

54. The computer readable medium according to claim 53, wherein said time slot field comprises five bits to indicate said one destination time slot.

55. The computer readable medium according to claim 53, wherein said line field comprises five bits to indicate said output communication line.

56. The computer readable medium according to claim 49, wherein said method further comprises:
encoding a timing source field into said destination address field, said timing source field indicating a predetermined number of timing domains for transmitting said each packet to said destination module.

57. The computer readable medium according to claim 49, wherein said destination slot field comprises four bits to identify said destination module.

58. A computer readable medium containing executable instructions, which, when executed in a processing system, cause said processing system to perform a method comprising:
receiving a plurality of packets, each packet of said plurality of packets containing destination information related to a destination module for a predetermined amount of data contained within said each packet, wherein said destination information comprises a destination address field identifying said destination module for said each packet wherein said destination address field comprises a time slot field, indicating one destination time slot of a plurality of destination time slots assigned to an output communication line coupled to said destination module, and a line field indicating said output communication line; and transmitting said each packet to said destination module based on said destination information.

59. The computer readable medium according to claim 58, wherein said destination address field comprises a destination slot field identifying said destination module for said each packet.

60. The computer readable medium according to claim 59, wherein said transmitting further comprises transmitting said each packet to said destination module based on said destination slot field of said destination address field.

61. The computer readable medium according to claim 58, wherein said destination address field comprises a timing source field indicating a predetermined number of timing domains for transmitting said each packet to said destination module.

62. The computer readable medium according to claim 58, wherein said transmitting further comprises storing said each packet into one storage module of a plurality of storage modules contained within said destination module based on said time slot field and said line field of said destination address field.

63. The computer readable medium according to claim 62, wherein each storage module of said plurality of storage modules is a first-in-first-out (FIFO) storage module.

64. The computer readable medium according to claim 62, wherein each storage module of said plurality of storage modules has a capacity of four bytes and corresponds to one channel of said output communication line.

65. A computer readable medium containing executable instructions, which, when executed in a processing system, cause said processing system to perform a method comprising:

retrieving a plurality of packets stored into a plurality of storage modules, each packet of said plurality of packets being retrieved from one storage module of said plurality of storage modules at a rate dictated by a destination address field contained within said each packet, wherein said destination address field comprises a timing source field indicating a predetermined number of timing domains available to transmit said each packet; and multiplexing said each packet to obtain a communication to be transmitted along an output communication line.

66. The computer readable medium according to claim 65, wherein each storage module of said plurality of storage modules is a first-in-first-out (FTFO) storage module.

67. The computer readable medium according to claim 65, wherein each storage module of said plurality of storage modules has a capacity of four bytes and corresponds to one channel of said output communication line.

68. The computer readable medium according to claim 65, wherein said timing source field comprises two bits to indicate said predetermined number of timing domains.

69. The computer readable medium according to claim 68, wherein said timing source field indicates up to four timing domains to transmit said each packet.

70. A system comprising:

a transmission module to receive a plurality of communications along at least one input communication line and to frame each communication into a plurality of packets, each packet of said plurality of packets containing destination information for a predetermined amount of data contained within said each packet, encode a destination address field into said destination information of said each packet, said destination address field identifying said destination module for said each packet, and encode a destination slot field into said destination address field, said destination slot field identifying said destination module for said each packet; and a packet switch coupled to said transmission module to receive each packet of said plurality of packets and to transmit said each packet to a destination module based on said destination information.

71. The system according to claim 70, further comprising at least one timing device coupled to said packet switch, said transmission module, and said destination module to distribute at least one timing reference to said transmission module and said destination module.

72. The system according to claim 71, wherein said transmission module and said destination module operate at a predetermined rate dictated by said at least one timing reference.

73. The system according to claim 70, wherein said packet switch is a high-speed packet switch.

74. The system according to claim 70, wherein each communication of said plurality of communications includes time division multiplexed (TDM) traffic and data traffic.

75. The system according to claim 74, wherein said transmission module further frames said TDM traffic into at least one packet containing high priority data and said data traffic into at least one packet containing low priority data transmitted during said each communication.

76. The system according to claim 75, wherein said transmission module further encodes a predetermined value into a priority field within said each packet, said predetermined value indicating a priority of transmission for said predetermined amount of data within said each packet.

77. The system according to claim 76, wherein said priority field within said at least one packet containing high priority data has a zero value.

78. The system according to claim 76, wherein said priority field within said at least one packet containing low priority data has a one value.

79. The system according to claim 70, wherein said transmission module further encodes a time slot field into said destination address field, said time slot field indicating one destination time slot of a plurality of destination time slots assigned to an output communication line coupled to said destination module and further encodes a line field into said destination address field, said line field indicating said output communication line.

80. The system according to claim 79, wherein said time slot field comprises five bits to indicate said one destination time slot.

81. The system according to claim 79, wherein said line field comprises five bits to indicate said output communication line.

82. The system according to claim 79, wherein said packet switch further stores said each packet into one storage module of a plurality of storage modules contained within said destination module based on said time slot field and said line field of said destination address field.

83. The system according to claim 82, wherein each storage module of said plurality of storage modules is a first-in-first-out (FIFO) storage module.

84. The system according to claim 82, wherein each storage module of said plurality of storage modules has a capacity of four bytes and corresponds to one channel of said output communication line.

85. The system according to claim 70, wherein said transmission module further encodes a timing source field into said destination address field, said timing source field indicating a predetermined number of timing domains for transmitting said each packet to said destination module.

86. The system according to claim 85, wherein said timing source field comprises two bits to indicate said predetermined number of timing domains.

87. The system according to claim 70, wherein said destination slot field comprises four bits to identify said destination module.

88. The system according to claim 70, wherein said packet switch further transmits said each packet to said destination module based on said destination slot field of said destination address field.

89. The system according to claim 70, wherein said destination module further retrieves said each packet stored into one storage module of a plurality of storage modules at a rate dictated by a destination address field encoded into said destination information of said each packet and multiplexes said each packet to obtain an output communication to be transmitted along an output communication line.

90. The system according to claim 89, wherein said destination address field comprises a timing source field indicating a predetermined number of timing domains available to transmit said each packet.

91. The system according to claim 90, wherein said timing source field comprises two bits to indicate said predetermined number of timing domains.

92. The system according to claim 90, wherein said timing source field indicates up to four timing domains to transmit said each packet.

93. A system comprising:
a transmission module to
receive a plurality of communications along at least one input communication line and to frame each communication into a plurality of packets, each packet of said plurality of packets containing destination information for a predetermined amount of data contained within said each packet,
encode a destination address field into said destination information of said each packet, said destination address field identifying said destination module for said each packet, and
encode a time slot field into said destination address field, said time slot field indicating one destination time slot of a plurality of destination time slots assigned to an output communication line coupled to said destination module and further encodes a line field into said destination address field, said line field indicating said output communication line; and
a packet switch coupled to said transmission module to receive each packet of said plurality of packets and to transmit said each packet to a destination module based on said destination information.

94. The system according to claim 93, further comprising at least one timing device coupled to said packet switch, said transmission module, and said destination module to distribute at least one timing reference to said transmission module and said destination module.

95. The system according to claim 94, wherein said transmission module and said destination module operate at a predetermined rate dictated by said at least one timing reference.

96. The system according to claim 93, wherein each communication of said plurality of communications includes time division multiplexed (TDM) traffic and data traffic.

97. The system according to claim 93, wherein said transmission module further encodes a destination slot field into said destination address field, said destination slot field identifying said destination module for said each packet.

98. The system according to claim 97, wherein said packet switch further transmits said each packet to said destination module based on said destination slot field of said destination address field.

99. The system according to claim 93, wherein said transmission module further encodes a timing source field into said destination address field, said timing source field indicating a predetermined number of timing domains for transmitting said each packet to said destination module.

100. The system according to claim 93, wherein said packet switch further stores said each packet into one storage module of a plurality of storage modules contained within said destination module based on said time slot field and said line field of said destination address field.

101. The system according to claim 93, wherein said destination module further retrieves said each packet stored into one storage module of a plurality of storage modules at a rate dictated by a destination address field encoded into said destination information of said each packet and multiplexes said each packet to obtain an output communication to be transmitted along an output communication line.

102. The system according to claim 101, wherein said destination address field comprises a timing source field indicating a predetermined number of timing domains available to transmit said each packet.

103. A system comprising:
a transmission module to
receive a plurality of communications along at least one input communication line and to frame each communication into a plurality of packets, each packet of said plurality of packets containing destination information for a predetermined amount of data contained within said each packet,
encode a destination address field into said destination information of said each packet, said destination address field identifying said destination module for said each packet, and
encode a timing source field into said destination address field, said timing source field indicating a predetermined number of timing domains for transmitting said each packet to said destination module; and
a packet switch coupled to said transmission module to receive each packet of said plurality of packets and to transmit said each packet to a destination module based on said destination information.

104. The system according to claim 103, further comprising at least one timing device coupled to said packet switch, said transmission module, and said destination module to distribute at least one timing reference to said transmission module and said destination module.

105. The system according to claim 104, wherein said transmission module and said destination module operate at a predetermined rate dictated by said at least one timing reference.

106. The system according to claim 103, wherein each communication of said plurality of communications includes time division multiplexed (TDM) traffic and data traffic.

107. The system according to claim 103, wherein said transmission module further encodes a destination slot field into said destination address field, said destination slot field identifying said destination module for said each packet.

108. The system according to claim 107, wherein said packet switch further transmits said each packet to said destination module based on said destination slot field of said destination address field.

109. The system according to claim 103, wherein said transmission module further encodes a time slot field into said destination address field, said time slot field indicating one destination time slot of a plurality of destination time slots assigned to an output communication line coupled to said destination module and further encodes a line field into said destination address field, said line field indicating said output communication line.

110. The system according to claim 109, wherein said packet switch further stores said each packet into one storage module of a plurality of storage modules contained within said destination module based on said time slot field and said line field of said destination address field.

111. The system according to claim 103, wherein said destination module further retrieves said each packet stored into one storage module of a plurality of storage modules at a rate dictated by a destination address field encoded into said destination information of said each packet and multiplexes said each packet to obtain an output communication to be transmitted along an output communication line.

112. The system according to claim 111, wherein said destination address field comprises a timing source field indicating a predetermined number of timing domains available to transmit said each packet.

\* \* \* \* \*